United States Patent
Cronholm et al.

(10) Patent No.: US 9,930,506 B2
(45) Date of Patent: Mar. 27, 2018

(54) COMMUNICATION DEVICE FOR IMPROVED SHARING OF CONTENT

(71) Applicant: Crunchfish AB, Malmö (SE)

(72) Inventors: Paul Cronholm, Malmö (SE); Carl Tönsgård, Malmö (SE); Joakim Nydemark, Malmö (SE); Joachim Samuelsson, Helsingborg (SE)

(73) Assignee: CRUNCHFISH AB, Malmö (SE)

( * ) Notice: Subject to any disclaimer, the term of this patent is extended or adjusted under 35 U.S.C. 154(b) by 0 days.

(21) Appl. No.: 15/517,378

(22) PCT Filed: Oct. 7, 2015

(86) PCT No.: PCT/SE2015/051063
§ 371 (c)(1),
(2) Date: Apr. 6, 2017

(87) PCT Pub. No.: WO2016/056984
PCT Pub. Date: Apr. 14, 2016

(65) Prior Publication Data
US 2017/0245128 A1    Aug. 24, 2017

(30) Foreign Application Priority Data

Oct. 8, 2014 (SE) ........................ 1451203

(51) Int. Cl.
*H04M 3/42* (2006.01)
*H04W 4/20* (2018.01)
(Continued)

(52) U.S. Cl.
CPC ............ *H04W 4/206* (2013.01); *G06F 3/017* (2013.01); *G06F 3/023* (2013.01);
(Continued)

(58) Field of Classification Search
CPC ...................................................... H04W 4/206
(Continued)

(56) References Cited

U.S. PATENT DOCUMENTS

| | | | |
|---|---|---|---|
| 9,384,334 B2* | 7/2016 | Burba | G06F 21/105 |
| 2010/0257251 A1 | 10/2010 | Mooring et al. | |
| 2013/0159001 A1* | 6/2013 | Stifelman | G06F 3/167 |
| | | | 704/257 |

FOREIGN PATENT DOCUMENTS

| WO | 2013074102 A1 | 5/2013 |
|---|---|---|
| WO | 2013131475 A1 | 9/2013 |

(Continued)

OTHER PUBLICATIONS

Notice of allowance from corresponding SE application No. 1451203-2 dated Apr. 28, 2017.
(Continued)

*Primary Examiner* — Charles Shedrick
(74) *Attorney, Agent, or Firm* — McNair Law Firm, P.A.

(57) ABSTRACT

A communication device (100) comprising a controller (210), a radio frequency interface (230) and a memory (240), wherein the controller is configured to identify at least one receiving communication device (100B, 100C); present content (510); receive one user input (U) indicating a share; and share the content (510) with the at least one receiving communication device (100B, 100C) through the sharing network over the radio frequency interface (230); wherein the communication device (100) is characterized in that the controller (210) is further configured to identify the receiving communication device (100B, 100C) by the controller (210) being configured to detect a presence of the receiving communication device (100B, 100C) being in close proximity and then initiate a connection with the at least one receiving communication device (100B, 100C) and wherein (Continued)

the controller is configured to share content upon initiating the connection thereby establishing a sharing network (400) automatically.

20 Claims, 8 Drawing Sheets

(51) Int. Cl.
| | |
|---|---|
| *G06F 3/01* | (2006.01) |
| *H04W 4/00* | (2018.01) |
| *G06F 3/023* | (2006.01) |
| *G06F 3/0488* | (2013.01) |
| *G06F 3/16* | (2006.01) |
| *H04W 4/06* | (2009.01) |
| *H04W 8/00* | (2009.01) |
| *H04W 76/02* | (2009.01) |
| *H04W 84/18* | (2009.01) |
| *H04M 1/02* | (2006.01) |

(52) U.S. Cl.
CPC .......... *G06F 3/04883* (2013.01); *G06F 3/167* (2013.01); *H04W 4/008* (2013.01); *H04W 4/06* (2013.01); *H04W 8/005* (2013.01); *H04W 76/023* (2013.01); *H04M 1/0264* (2013.01); *H04M 2250/22* (2013.01); *H04W 84/18* (2013.01)

(58) Field of Classification Search
USPC ...................................................... 455/414.1
See application file for complete search history.

(56) References Cited

FOREIGN PATENT DOCUMENTS

| WO | 2014021769 A2 | 2/2014 |
|---|---|---|
| WO | 2014106380 A1 | 7/2014 |

OTHER PUBLICATIONS

Office Action for corresponding Swedish Patent Application No. 1651307-9 dated Apr. 27, 2017.
Xing, Bo, et al, "Proximiter: Enabling Mobile Proximity-Based Content Sharing on Portable Devices," 2009 IEEE International Conference on Pervasive Computing and Communications, Mar. 9-13, 2009.
International Search Report and Written Opinion of corresponding application No. PCT/SE2015/051063 dated Jul. 10, 2015.
Examination report of corresponding application No. SE 1451203-2 dated Feb. 12, 2016.
Chapter II International Preliminary Report on Patentability of corresponding application No. PCT/SE2015/051063 dated Feb. 21, 2017.

\* cited by examiner

COMMUNICATION DEVICE FOR IMPROVED SHARING OF CONTENT

TECHNICAL FIELD

This application relates to a method, a computer-readable medium and a communication device, such as a mobile communications terminal, for improved sharing of content.

BACKGROUND

When sharing content, such as images or sound, a connection with a device to share to have to be established. To establish this connection the receiving device has to be identified often manually by the sending device, and the connection be accepted. Also the manner of sharing the content has to be established. Furthermore, as content is shared, using contemporary techniques where the sender only takes a few actions, the receiving side has to perform actins to retrieve the shared content. This requires many user actions on both the sending party and the receiving party's end, and especially so if the content is to be shared with more than one user.

The problem occurs especially when a sharing is to be performed with someone that one has not shared content with before.

Simplified sharing manners have been proposed, however, these are always through a third party necessitating that the receiving user go and retrieve the shared content from the third party.

There is thus a need for an improved manner of sharing content requiring a minimum of user actions, both on the sender side and on the receiver side.

SUMMARY

The inventors of the present invention have realized, after inventive and insightful reasoning that by utilizing for example beacon technologies for detecting other communication devices in the proximity, a sharing network automatically may be generated automatically. Taking advantage of the simplicity of this, the content may be shared seamlessly and effortlessly with a minimum of user actions, even to a large number of receivers and also with receivers that one has previously not communicated with. The recipients of content to be shared will simply be all devices part of the sharing network. The beacon technologies are often short range thereby limiting the sharing to those communication devices that are in close proximity to a user. This enables a use similar to sharing printed photographs, where one shows the photographs to those that are nearby. Also, a recipient will be provided with shared content without taking any action—apart from possibly accepting the content (for example through a prompt or by activating a link). The recipient will thus no longer have to establish a connection or to go out on various social media to search for the content to be shared.

This provides an elegant and effortless manner of sharing content almost automatically requiring a minimum of user actions, by automatically sensing the presence of other devices in the proximity, establishing a sharing network proactively and automatically, whereby a user only needs to perform one user input to share the content with many receivers. Likewise, no action (apart from a possible confirmation or acceptance) is required by the receivers.

It is an object of the teachings of this application to overcome the problems listed above by providing a communication device comprising a controller, a radio frequency interface, a memory and a camera, wherein the controller is configured to identify at least one receiving communication device and initiating a connection with the at least one receiving communication device thereby establishing a sharing network; present content; receive one user input; and sharing the content with the at least one receiving communication device through the radio frequency interface, wherein the communication device is characterized in that the controller is further configured to identify the receiving communication device by the controller being configured to detect a presence of the receiving communication device; initiate the connection with the receiving communication device automatically.

In one embodiment, the communication device is a mobile communications terminal such as a tablet computer, a smartphone or a laptop computer. In one embodiment, the communication device is a game console. In one embodiment, the communication device is a media device such as a music and/or video playing device.

It is also an object of the teachings of this application to overcome the problems listed above by providing a method for use in a communication device comprising a controller, a radio frequency interface, a memory and a camera, wherein the method comprises: identifying at least one receiving communication device and initiating a connection with the at least one receiving communication device thereby establishing a sharing network; presenting content; receive one user input; and sharing the content with the at least one receiving communication device through the radio frequency interface, wherein the method is characterized in that the method further comprises identifying the receiving communication device by detecting a presence of the receiving communication device; initiating the connection with the receiving communication device automatically.

It is a further object of the teachings of this application to overcome the problems listed above by providing a receiving communication device comprising a controller, a radio frequency interface, a memory and a camera, wherein the controller is configured to: identify at least one communication device and initiating a connection with the at least one communication device thereby establishing a sharing network; receive content from one of said at least one communication device, wherein the receiving communication device is characterized in that the controller is further configured to identify the at least one communication device by the controller being configured to detect a presence of the communication device; and initiate the connection with the communication device automatically.

It is a further object of the teachings of this application to overcome the problems listed above by providing a method for use in a receiving communication device comprising a controller, a radio frequency interface, a memory and a camera, wherein the method comprises: identifying at least one communication device and initiating a connection with the at least one communication device, thereby establishing a sharing network; receiving content from one of said at least one communication device, wherein the method is characterized in that the method further comprises identifying the at least one communication device by detecting a presence of the communication device; and initiating the connection with the communication device automatically.

It is a further object of the teachings of this application to overcome the problems listed above by providing a communication device comprising a controller, a radio frequency interface, a memory and a camera, wherein the controller is configured to: identify at least one receiving communication device through a short range communication standard and establishing a connection with the at least one receiving communication device thereby establishing a sharing network; present content receive one user input; and sharing the content with the at least one receiving communication device through the radio frequency interface, wherein the communication device is characterized in that the controller is further configured to identify the receiving communication device by the controller being configured to detect a presence of the receiving communication device; establish the connection with the receiving communication device automatically.

It is a further object of the teachings of this application to overcome the problems listed above by providing a method for use in a communication device comprising a controller, a radio frequency interface, a memory and a camera, wherein the method comprises: identifying at least one receiving communication device through a short range communication standard and establishing a connection with the at least one receiving communication device thereby establishing a sharing network; presenting content; receive one user input; and sharing the content with the at least one receiving communication device through the radio frequency interface, wherein the method is characterized in that the method further comprises identifying the receiving communication device by detecting a presence of the receiving communication device; establishing the connection with the receiving communication device automatically.

It is a further object of the teachings of this application to overcome the problems listed above by providing a computer readable medium comprising instructions that when loaded into and executed by a controller, such as a processor, cause the execution of a method according to herein.

The teachings herein find use in control systems for devices having user interfaces such as mobile phones, smart phones, tablet computers, laptop computers, gaming consoles and media and other infotainment devices.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
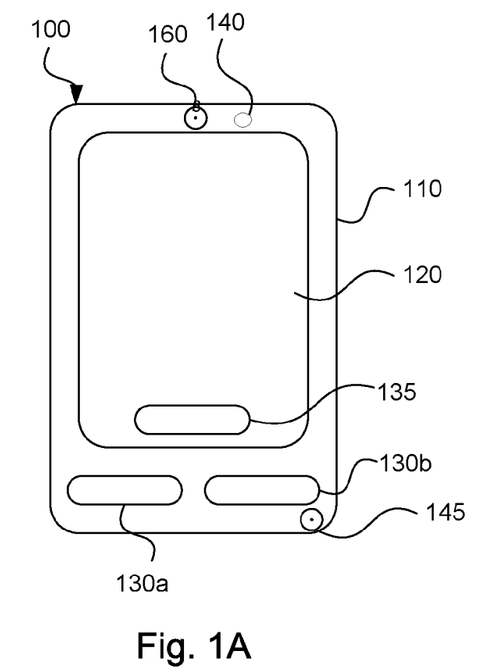
FIGS. 1A and 1B are schematic views of each a communication device according to the teachings herein.
Figure 1B:
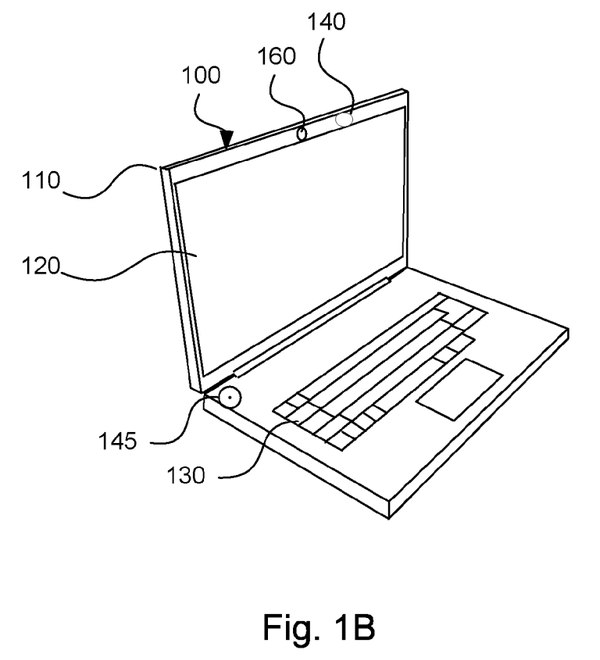

FIG. 1 generally shows a communication device 100 according to an embodiment herein. In one embodiment the communication device 100 is configured for wireless network communication. Examples of a communication device 100 are: a laptop computer, a tablet computer, a mobile communications terminal such as a mobile telephone or a smart phone, a personal digital assistant and a game console. Such examples are portable. Other examples may include a desktop computer or computer integrated display. Two embodiments will be exemplified and described as being a smartphone in FIG. 1A, a laptop computer 100 in FIG. 1B as an example of a computer and a tablet computer.

Referring to FIG. 1A a mobile communications terminal in the form of a smartphone 100 or a tablet computer 100 (arranged with a wireless communication interface) comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100. The smartphone 100 is also equipped with a camera 160. The camera 160 is a digital camera that is arranged to take video or still photographs by recording images on an electronic image sensor (not shown). In one embodiment the camera 160 is an external camera. In one embodiment the camera is alternatively replaced by a source providing an image stream. The smartphone 100 may also be equipped with a loud speaker 140 and a microphone 145.

Referring to FIG. 1B a laptop computer 100 comprises a display 120 and a housing 110. The housing comprises a controller or CPU (not shown) and one or more computer-readable storage mediums (not shown), such as storage units and internal memory. Examples of storage units are disk drives or hard drives. The laptop computer 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a laptop computer 100 to connect with other computing devices or a server.

The laptop computer 100 further comprises at least one input unit such as a keyboard 130. Other examples of input units are computer mouse, touch pads, touch screens or joysticks to name a few.

The laptop computer 100 is further equipped with a camera 160. The camera 160 is a digital camera that is arranged to take video or still photographs by recording images on an electronic image sensor (not shown). In one embodiment the camera 160 is an external camera. In one embodiment the camera is alternatively replaced by a source providing an image stream.

The laptop computer 100 may also be equipped with a loud speaker 140 and a microphone 145.

The communication device according to FIG. 1 is configured to detect and track an object, in this example a hand H (illustrated in FIG. 5A), via the camera 160. How such an object H is detected and tracked is disclosed in the Swedish patent application SE 1250910-5 and will not be discussed in further detail in the present application. For further details on this, please see the mentioned Swedish patent application. It should be noted, however, that the teachings of the present application may be implemented through the use of other tracking manners than disclosed in Swedish patent application SE 1250910-5.

Figure 2:
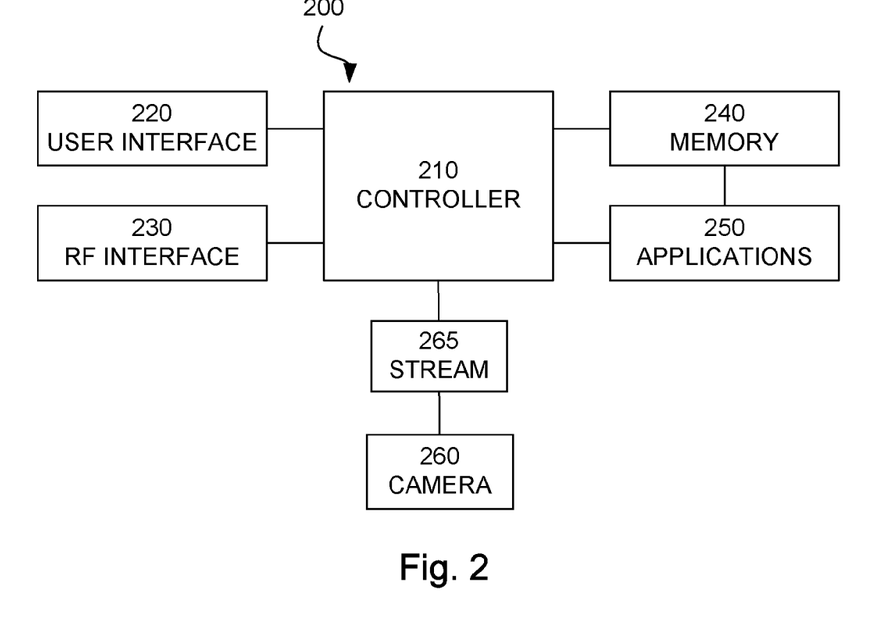
FIG. 2 is a schematic view of the components of a communication device according to the teachings herein.

FIG. 2 shows a schematic view of the general structure of a communication device according to FIG. 1. The device 100 comprises a controller 210 which is responsible for the overall operation of the computing device 200 and is preferably implemented by any commercially available CPU ("Central Processing Unit"), DSP ("Digital Signal Processor") or any other electronic programmable logic device. The controller 210 is configured to read instructions from the memory 240 and execute these instructions to control the operation of the computing device 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the computing device 200. The software modules include a real-time operating system, drivers for a user interface 220, an application handler as well as various applications 250.

The computing device 200 further comprises a user interface 220, which in the computing device of FIGS. 1A and 1B is comprised of the display 120 and the keys 130, 135. The user interface may also comprise the microphone 145 and the loudspeaker 144. The microphone and the loudspeaker may be arranged to form a group as has been disclosed in the Swedish patent application SE 1450293-4.

The computing device 200 may further comprises a radio frequency interface 230, which is adapted to allow the computing device to communicate with other devices through a radio frequency band through the use of different radio frequency technologies. Examples of such technologies are short-range standards IEEE 802.11, IEEE 802.15, ZigBee, WirelessHART, WIFI and Bluetooth® and long-range standards W-CDMA/HSPA, GSM, UTRAN and LTE to name a few. It should be noted that, as is commonly known, the radio frequency interface may be arranged to communicate according to more than one technology and many different combinations exist, for example a smartphone is commonly arranged to communicate according to the Bluetooth™ standard, the WiFi standard and the LTE standard.

The computing device 200 is further equipped with a camera 260. The camera 260 is a digital camera that is arranged to take video or still photographs by recording images on an electronic image sensor (not shown).

The camera 260 is operably connected to the controller 210 to provide the controller with a video stream 265, i.e. the series of images captured, for further processing possibly for use in and/or according to one or several of the applications 250.

In one embodiment the camera 260 is an external camera or source of an image stream.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 3:
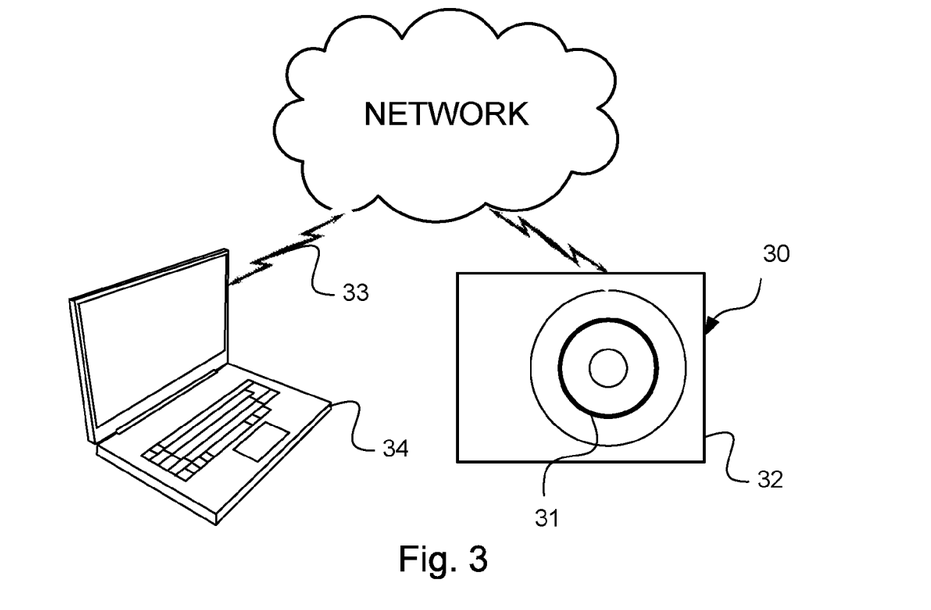
FIG. 3 is a schematic view of a computer-readable memory according to the teachings herein.

FIG. 3 shows a schematic view of a computer-readable medium as described in the above. The computer-readable medium 30 is in this embodiment a data disc 30. In one embodiment the data disc 30 is a magnetic data storage disc. The data disc 30 is configured to carry instructions 31 that when loaded into a controller, such as a processor, executes a method or procedure according to the embodiments disclosed above. The data disc 30 is arranged to be connected to or within and read by a reading device 32, for loading the instructions into the controller. One such example of a reading device 32 in combination with one (or several) data disc(s) 30 is a hard drive. It should be noted that the computer-readable medium can also be other mediums such as compact discs, digital video discs, flash memories or other memory technologies commonly used.

The instructions 31 may also be downloaded to a computer data reading device 34, such as a laptop computer or other device capable of reading computer coded data on a computer-readable medium, by comprising the instructions 31 in a computer-readable signal 33 which is transmitted via a wireless (or wired) interface (for example via the Internet) to the computer data reading device 34 for loading the instructions 31 into a controller. In such an embodiment the computer-readable signal 33 is one type of a computer-readable medium 30.

The instructions may be stored in a memory (not shown explicitly in FIG. 3, but referenced 240 in FIG. 2) of the laptop computer 34.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

An improved manner for sharing content between two or more communication devices using touchless control of a communication device will be disclosed below with reference to the accompanying figures. The examples will be illustrated focusing on the gestures made and the resulting content sharing, but it should be clear that the processing is performed in part or fully in a communication device comprising a controller as disclosed above with reference to FIGS. 1 and 2 or caused to be performed by executing instructions stored on a computer-readable medium as disclosed with reference to FIG. 3.

Figure 4A:
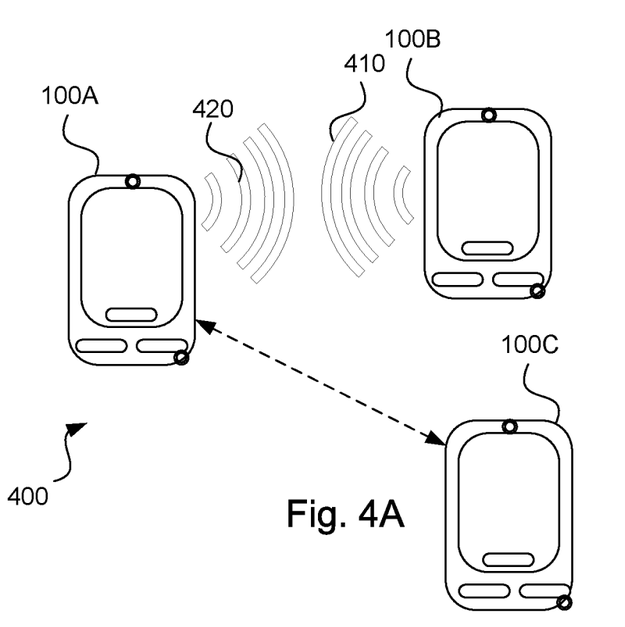
FIGS. 4A and 4B each shows an example embodiment of establishing a sharing network according to the teachings herein.

FIG. 4A shows an example of a network 400 comprising at least one communication device 100 such as in FIG. 1 and FIG. 2. The network 400 is a network of potential recipients and will be referred to as a sharing network 400. In the example of FIG. 4A, the sharing network 400 comprises a first communication device 100A which is already connected to a third communication device 100C. The connection may be established through a Bluetooth or WiFi connection or it may simply be a virtual connection indicating that the first communication device 100A and the third communication device 100C are aware of the other's presence and identity so that a connection can be quickly established as needed.

As a second communication device 100B comes into range of or in close proximity to the first communication device 100A, the first communication device 100A is configured to detect the presence of the second communication device 100B. The range may be determined by a short range communication standard being used. The presence may be announced by the first communication device 100A and the second communication device 100B emitting Bluetooth broadcast messages that are intercepted by the other communication devices. In FIG. 4A the emitted identifying broadcasts and any response are indicated as 410 and 420 respectively.

In one embodiment the identifying broadcasts are emitted using the radio frequency interface 230 according to a low power Bluetooth™ standard.

As part of the identifying the first communication device receives an identifier for the second communication device o establishing a connection using another communication standard than the one used for detecting the second communication standard. For example an IP address or other identifier.

As has been disclosed in the above, the radio frequency interface may comprise different modules arranged to communicate according to different standards, for example Bluetooth™, Wifi and LTE. In one embodiment, the second communication device 100B may be detected over one radio frequency technology, for example Bluetooth™ as discussed above, whereas any sharing (more on this in the disclosure below) may be conducted over another radio frequency technology, for example WiFi or LTE. This enables a low power solution for detecting a presence while allowing for high speed data transfer when actually sharing content. It also enables sharing via a server or cloud function without requiring Bluetooth beacons and at higher data speeds.

The establishing of the sharing network may be achieved as a background progress without any user interaction such as prompting or otherwise through the use of a specified application running on the communication devices to be connected. The communication devices are then configured to detect that the other communication device is running the same or a compatible sharing application (no difference will be made between a same and a compatible sharing application) and then establish or associate the connection automatically as the presence of a communication device is detected. In the following no difference will be made between actually establishing a connection or associating two devices for future connection. Both will be referred to as initiating a connection. The sharing application may be identified through the type of identifying broadcasting or as part of a message included in the identifying broadcasting or by the communication device 100A prompting a response from the detected communication device to identify which, if any, sharing application is executed by the detected communication device.

Manners of detecting a communication device and associating the communication device with a connection are known in the art and will not be discussed in further detail herein.

In one embodiment the identifying broadcasts are sound signals, both audible and/or inaudible, emitted through the loudspeaker 140 of one communication device and intercepted by the microphone of the other communication device as has been disclosed in the Swedish application SE 1450293-4 for establishing a group of communication devices.

Figure 4B:
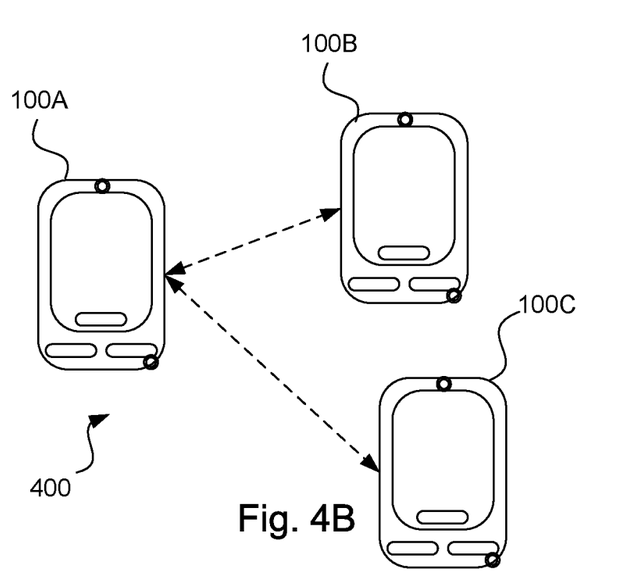

FIG. 4B shows the sharing network 400 as the first communication device 100A has established or associated a connection with the second communication device 100B.

It should be noted that even though the illustration of FIGS. 4A and 4B only indicate a connection between the first communication device 100A and the second communication device 100B and a connection between the first communication device 100A and the third communication device 100C, there could also be a connection between the second communication device 100B and the third communication device 100C.

In the following there will not be made any difference between an established connection and an associated connection and they will be referred to as an initiation.

Figure 5A:
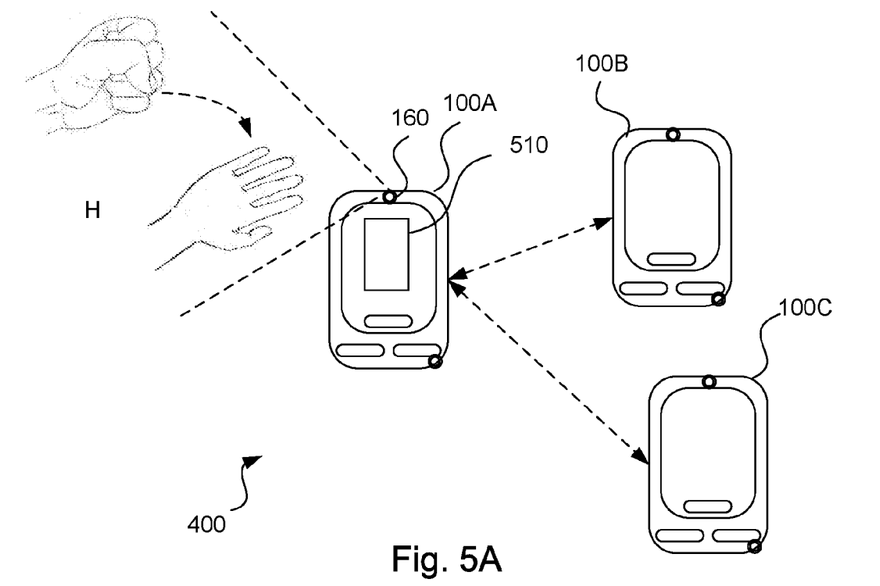
FIGS. 5A and 5B each shows an example embodiment of sharing in a sharing network according to the teachings herein, wherein a user input is received in touchless manner.

FIG. 5A shows an illustration of a first communication device 100A being part of a sharing network 400 as in FIG. 4, being connected to a second communication device 100B and a third communication device 100C. The first communication device 100A is currently presenting a content 510 to a user. The content 510 presented and the manner of presentation depends on the type of content 510.

In one embodiment the content 510 is an image or video file and the manner of presenting the content 510 is to display the content 510. In one embodiment the content 510 is a music or sound file and the manner of presenting the content 510 is to play the content 510. In one embodiment the content 510 is a playlist file and the manner of presenting the content 510 is to play and/or display a media file being included in the playlist. In one embodiment the content 510 is a word processing file, a spreadsheet file, a presentation file or other data file and the manner of presenting the content 510 is to display the graphical representation of the content 510.

In the following the content 510 will be exemplified as being an image file 510, possibly captured by the camera 160 of the first communication device 100A.

The image may in one embodiment have been captured using a gesture recognizing application such as the GoCam™ application which enables a user to capture an image, such as a "selfie" by closing a fist in front of the camera.

The first communication device 100A is configured to present content 510, and detect and track an object, such as a hand H, and detect and identify a user gesture performed by the tracked object. In FIG. 5A the object, i.e. the hand H, is within the field of view of the camera 160 as is indicated by the dashed lines. In the example of FIG. 5A the user gesture is a fist that is closed and then opens up to intuitively indicate that an item is grabbed and shared by dropping it on the sharing surface, i.e. the communication device 100A.

In combination with an image capturing application such as GoCam™ the gestures to capture an image and then share it may become closing a fist and then opening it or closing opening to take the picture and the closing (grabbing) to and open (dropping) to share the picture.

In one embodiment, where the content 510 is associated with sound, such as the content 510 being a music file that is being played, the user gesture may be a hand reaching out in the air and closing, thereby indicating a grabbing of the acoustic waves generated by the music, and then dropping the music against the display or camera of the communication device 100A.

If the first communication device 100A determines that the user gesture is associated with a file sharing command, the first communication device 100A is configured to determine at least one recipient for receiving the content 510.

In one embodiment the at least one recipient is identified as the communication devices 100B and 100C being included in the sharing network 400. In such an embodiment, the recipients are automatically identified and a connection to the recipient(s) is already established which enables for a fast and efficient identification and connection that does not require any user actions.

Figure 5B:
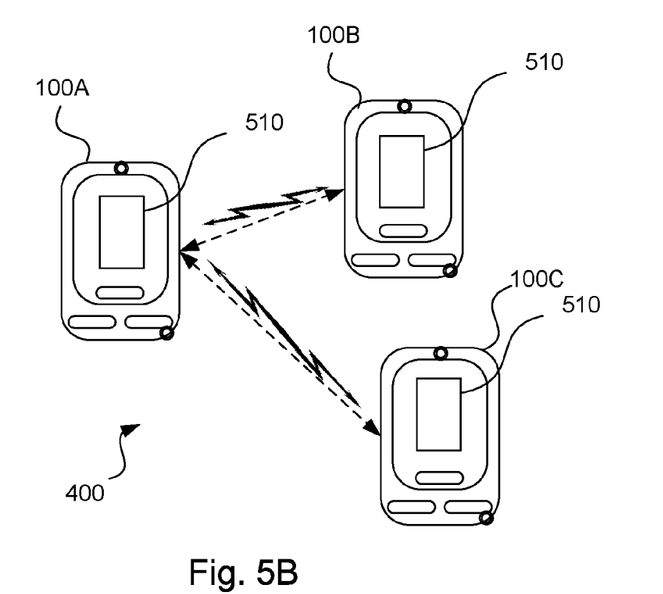

FIG. 5B shows an instance when the content 510 has been shared over the wireless connections (indicated by the zigzag arrows) from the first communication device 100A to the second communication device 100B and the third communication device 100C. In one embodiment the receiving communication device 100B or 100C may be configured to present the content 510 as it is received. In one embodiment the receiving communication device 100B or 100C may be configured to prompt for user acceptance before presenting the content 510 as it is received. In one embodiment the receiving communication device 100B or 100C may be configured to present an indication that the content 510 is received, possibly as part of an application icon (not shown) being displayed.

Figure 6:
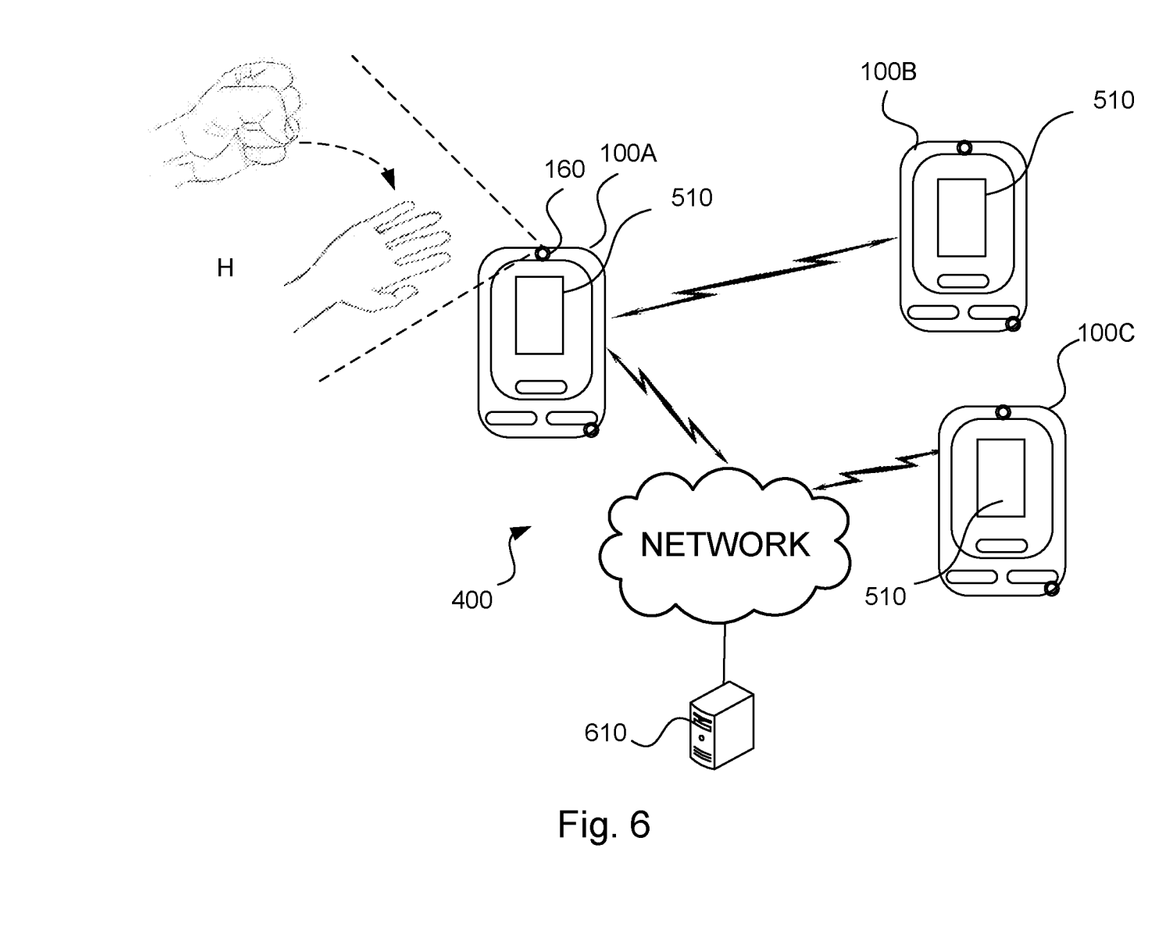
FIG. 6 shows an alternative example embodiment of sharing in a sharing network according to the teachings herein.

FIG. 6 shows an example where the content to be shared is not shared directly with the third communication device 100C, but the content 510 is shared via a server 610, possibly connected via a network such as the internet, or a dedicated network. The server may also represent a cloud function or service and no difference will be made between the two in the following disclosure. As is indicated in FIG. 6, the first communication device 100A may be configured to share content 510 directly with one communication device, the second communication device 100B, and to share content 510 indirectly via a server 610 with another communication device, the third communication device 100C.

If the content 510 is shared indirectly, the receiving communication device 100C receives an indication that the content 510 is to be retrieved and an identifier for the content 510 so that the receiving communication device 100C can retrieve the content from the server 610, possibly after user acceptance.

In one such embodiment, the content 510 may be stored temporarily at the server, wherein the third communication device 100C is notified that the content is to be retrieved within a time limit, for example 5 minutes, 10 minutes, 20 minutes, 30 minutes, 45 minutes, 60 minutes or 90 minutes being examples of suitable time intervals.

Figure 7A:
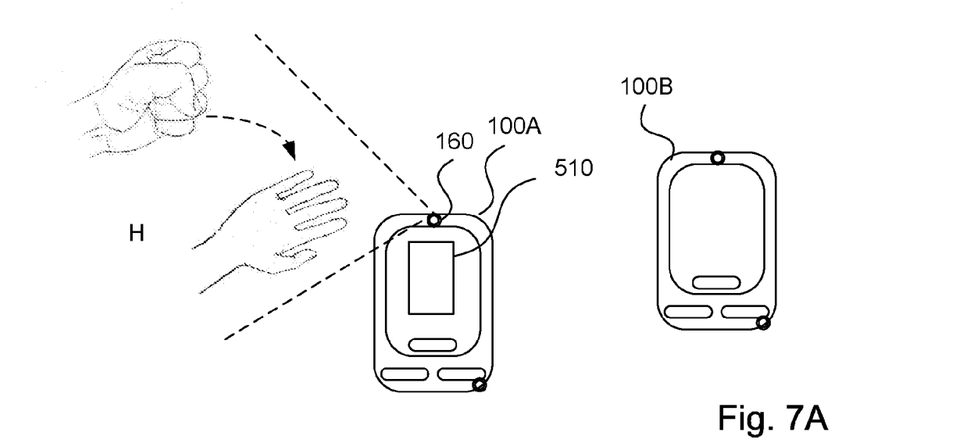
FIGS. 7A, 7B and 7C each shows an example embodiment of establishing and then sharing in a sharing network according to the teachings herein.
Figure 7B:
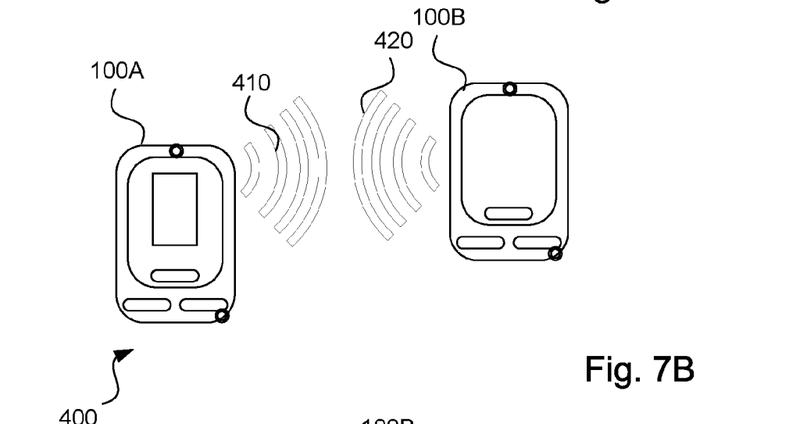
Figure 7C:
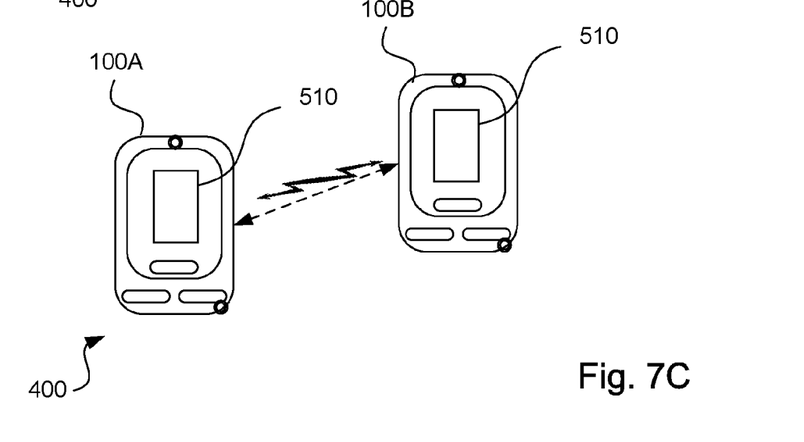

FIGS. 7A, 7B and 7C illustrate an alternative embodiment where the at least one recipient is identified by determining if there are any communication devices 100B, 100C in the presence of the first communication device 100A as a user gesture is detected and recognized as being a sharing command.

In FIG. 7A the content 510 is presented and a user gesture is detected and identified. In FIG. 7B the sharing network is established in a manner as disclosed above. And, in FIG. 7C the content is shared directly or indirectly Snot shown in FIG. 7C).

Figure 8:
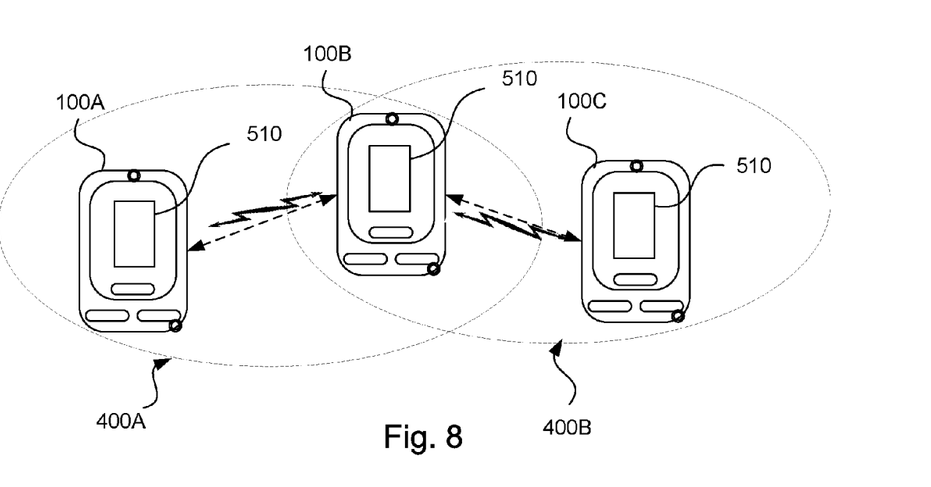
FIG. 8 shows an example embodiment of a chained sharing network according to the teachings herein.

In one embodiment the receiving communication device 100B is configured to further share any content 510 received with recipient in the receiving communication device's sharing network. This enables for a chained sharing where content is shared over a wider network. FIG. 8 shows an example of such a chained sharing where a first sharing network 400A and a second sharing network 400B overlap.

In such a chained sharing, the receiving communication device 100B is configured to determine if the content 510 has already been received from another communication device 100A and if not, determine a further recipient and share the content 510 onwards, i.e. to the remaining communication devices in the sharing network 400. This prevents sharing loops from arising. The content 510 may be identified with an identifier being determined by the first sharing communication device 100A and the identifier is shared along with the content.

Figure 9:
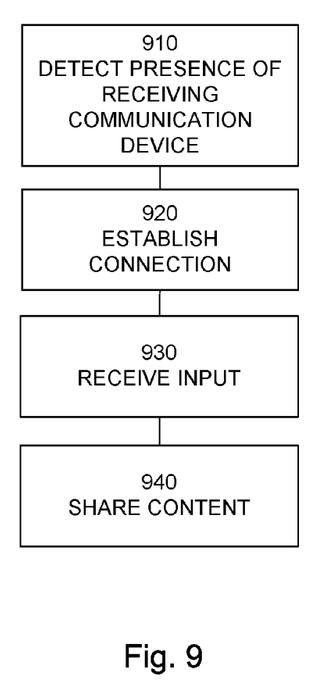
FIG. 9 shows a flowchart illustrating a general method according to an embodiment of the teachings herein.

FIG. 9 is a flowchart for a general method for use in a communication device 100 which is configured for identifying 910 at least one receiving communication device 100B, 100C and establishing or associating 920 i.e. initiating a connection with the at least one receiving communication device 100B, 100C thereby establishing a sharing network 400. The communication device also presents content 510 is arranged for detecting and tracking an object H in front of the camera 160 and detecting and identifying a user gesture performed by the object H or receiving other user input 930. The method further comprises identifying 910 the receiving communication device 100B, 100C by detecting a presence of the receiving communication device 100B, 100C and initiating the connection with the receiving communication device 100B, 100C automatically. The communication device determines whether the user gesture is associated with a share content command, and if so, shares 940 the content 510 with the at least one receiving communication device 100B, 100C through the radio frequency interface 230.

Figure 10:
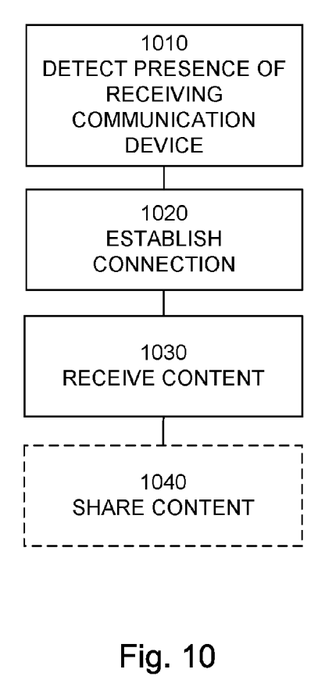
FIG. 10 shows a flowchart illustrating a general method according to an embodiment of the teachings herein.

FIG. 10 is a flowchart for a general method for use in a communication device 100 which is configured for identifying at least one communication device 100A, 100C by detecting 1010 a presence of the communication device 100A, 100C and establishing 1020 or associating a connection automatically with the at least one communication device 100B, 100C, thereby establishing a sharing network 400. The communication device receives 1030 content 510 from one of said at least one communication devices 100A, 100C and possibly shares 1040 the content 510 with another of the at least one receiving communication device 100B, 100C through the radio frequency interface 230 (indicated as being an optional feature by the dashed lines in FIG. 10).

The communication device receiving the content is thus enabled to receive content without the user performing any actions, apart from possibly accepting the content to be received. There is no need for the receiving user to establish or accept the connection. No need to go to any third party to look for the content to be shared. The only action the receiving user may have to perform is to actually accept the content. This may be user settable and is for protecting the receiving user's integrity in that he should not automatically be exposed to all content shared unless accepting it. This also reduces the risk of receiving unwanted or malicious content.

In one embodiment the content to be received is accepted by the user by being presented with a prompting for accepting the content, whereby the user gives his acceptance. The acceptance may be given as a gesture, press on a key (virtual or physical) voice command or a touch gesture to name a few options.

In one embodiment the content to be received is accepted by the user by being presented with a prompting for accepting the content, whereby the user gives his acceptance by activating the link, which may be done with one actuation o the link, actuating an key (virtual or physical), through a voice command or through a gesture, touchless or touch-based to name a few options.

Figure 11A:
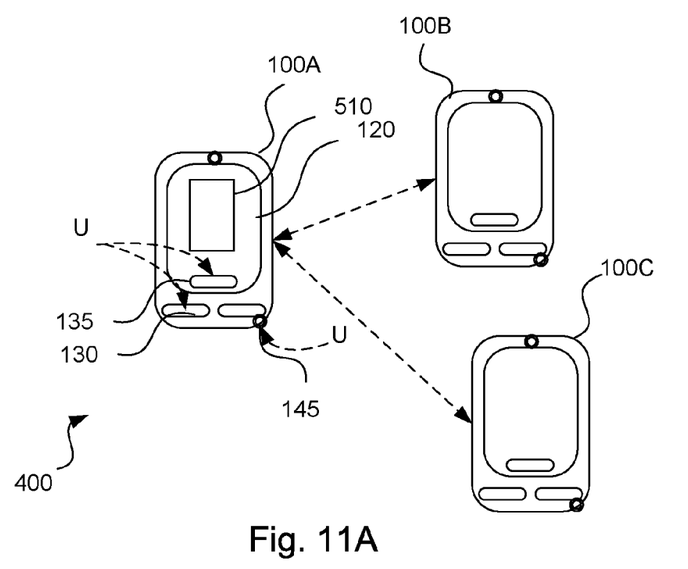
FIGS. 11A and 11B each shows an example embodiment of sharing in a sharing network according to the teachings herein, wherein a user input is received in an alternative manner.
Figure 11B:
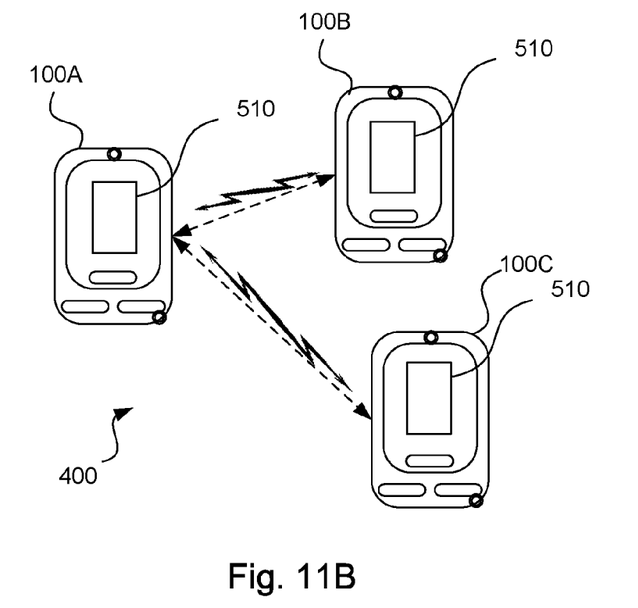

FIGS. 11A and 11B each shows an alternative example embodiment of sharing in a sharing network according to the teachings herein, wherein a user input is received in an alternative manner such as through the actuation or press on a key, virtual or physical. The user input may also be received as a voice command through a microphone 145. And the user input may also be received as a touch gesture through a touch display (or possibly touchpad) 120. In FIG. 11A, the user inputs U are indicated by dashed arrows pointing to the corresponding means for receiving the user input U, i.e. the keys 130/135, the touch display 120 and the microphone 145.

As the user input U has been received and determined to be a user input for sharing content, the content being presented 510 is shared. In FIG. 11B the content 510 has been shared with the second and third communication devices 100B and 100C respectively, each communication device now having its own copy of the content 510.

The establishing of the sharing network 400 and the sharing may be effected as has been disclosed above in relation to FIGS. 4, 5A, 5B, 6, 7A, 7B, 7C and 8, wherein touchless gestures are but one alternative for providing the user input U.

The teachings herein provide the benefit that a user is able to share content using the touchless control without having to perform any other action than performing the specified gesture thereby quickly and efficiently identifying recipients of the content to be shared and sharing the content with a minimum of effort on the part of the user.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A communication device (100A) comprising a controller (210), a radio frequency interface (230) arranged to operate according to the Bluetooth™ standard, and a memory (240), wherein the controller is configured to:
execute a sharing application stored in the memory (240);
identify at least one receiving communication device (100B, 100C) by detecting a presence of the receiving communication device (100B, 100C) being in close proximity, wherein close proximity is being within range of short range communication;
establish a sharing network comprising the at least one receiving communication device (100B, 100C);
present content (510);
receive a user input (U) indicating a share; and
share the content (510) with the at least one receiving communication device (100B, 100C) through the sharing network over the radio frequency interface (230);
wherein the communication device (100A) is characterized in that the controller (210) is further configured to identify the receiving communication device (100B, 100C) by
identifying the at least one receiving communication device (100B, 100C) through receiving an identifying broadcast emitted by the at least one receiving communication device (100B, 100C) according to a Low Power Bluetooth™ standard and by
detecting that the receiving communication device (100B, 100C) is executing a compatible sharing application, wherein the sharing application is identified through the type of identifying broadcast or as part of a message included in the identifying broadcast or by the communication device (100A) prompting a response from the detected receiving communication device (100B, 100C) to identify which sharing application is executed by the receiving communication device (100B, 100C),
and then initiating a connection with the at least one receiving communication device (100B, 100C) thereby establishing the sharing network (400) automatically,
wherein the sharing network is established automatically without requiring the at least one receiving device to receive any user action,
wherein the controller is configured to share content upon receiving the user input,
wherein at least one receiving communication device (100C) of the at least one receiving communication device (100B, 100C) is a receiving device (100C) that the communication device (100A) has previously not communicated with,
wherein the radio frequency interface (230) is also arranged to operate according to a long range communication standard comprising the LTE (Long Term evolution) standard, and
wherein the controller is configured to detect the presence of the at least one receiving communication device (100B, 100C) utilizing the Low Power Bluetooth™ standard and to share the content (510) with the receiving communication device (100B, 100C) utilizing the long range communication standard.

2. The communication device (100A) of claim 1, wherein the controller (210) is further configured to share the content in conjunction with receiving the user input, thereby sharing the content only with the at least one receiving communication device (100B, 100C) being identified as being part of the sharing network concurrently with receiving the user input.

3. The communication device (100A) of claim 1, wherein the sharing network is established automatically without requiring any user action.

4. The communication device (100A) of claim 1, wherein the sharing network is established and the sharing is effected through only receiving one user action.

5. The communication device (100A) of claim 1, wherein the content (510) is stored in the memory (240).

6. The communication device (100A) of claim 1, wherein the controller (210) is further configured to establish the connection with the at least one receiving communication device (100B, 100C) over a wireless connection through the radio frequency interface.

7. The communication device (100A) of claim 1, wherein the controller (210) is further configured to associate the at least one receiving communication device (100B, 100C) for later establishing of the connection with the at least one receiving communication device (100B, 100C) over a wireless connection through the radio frequency interface (230).

8. The communication device (100A) of claim 1, wherein the controller (210) is further configured to share the content (510) via a server (610) or cloud function.

9. The communication device (100A) of claim 1 further comprising a camera, and wherein the controller (210) is further configured to receive the user input (U) by
    detecting and tracking an object (H) in front of the camera (160); and
    detecting and identifying a user gesture performed by the object (H), wherein the user gesture is associated with a share command.

10. The communication device (100A) of claim 1, wherein the controller (210) is further configured to receive the user input (U) by receiving a press or actuation of a key (135, 130), wherein the key is a virtual key (135) or a physical key (130).

11. The communication device (100A) of claim 1, wherein the communication device further comprises a microphone (145) wherein the controller (210) is further configured to receive the user input (U) by receiving a voice command through the microphone (145).

12. The communication device (100A) of claim 1, wherein the communication device further comprises a touch display (120) wherein the controller (210) is further configured to receive the user input (U) by receiving a gesture on said touch display (120).

13. A receiving communication device (100B) comprising a controller (210), a radio frequency interface (230) arranged to operate according to a Low Power Bluetooth™ standard, and a memory (240), wherein the controller is configured to:
    execute a sharing application stored in the memory (240);
    identify at least one communication device (100A, 100C) by detecting a presence of the at least one communication device (100A, 100C) being in close proximity, wherein close proximity is being within range of short range communication and by receiving an identifying broadcast emitted by the at least one communication device (100A, 100C) according to the Low Power Bluetooth™ standard and
    detecting that the at least one communication device (100A, 100C) is executing a compatible sharing application, wherein the sharing application is identified through the type of identifying broadcast or as part of a message included in the identifying broadcast or by the receiving communication device (100B) prompting a response from the detected at least one communication device (100A, 100C) to identify which sharing application is executed by the at least one communication device (100A, 100C);
    establishing of a connection initiated by the at least one communication device (100A, 100C) thereby establishing a sharing network (400), wherein the sharing network is established automatically without requiring the receiving device to receive any user action;
    receive content (510) from one of said at least one communication device (100A, 100C),
    wherein at least one receiving communication device (100C) of the at least one communication device (100B, 100C) is a receiving device (100C) that the communication device (100A) has previously not communicated with,
    wherein the radio frequency interface (230) is also arranged to operate according to a long range communication standard comprising the LTE (Long Term evolution) standard, and
    wherein the controller is configured to detect the presence of the at least one communication device (100B, 100C) utilizing the Low Power Bluetooth™ standard and to share the content (510) with the receiving communication device (100B, 100C) utilizing the long range communication standard.

14. The receiving communication device (100B) of claim 13, wherein the content is received without receiving any user input.

15. The receiving communication device (100B) of claim 13, wherein the content is received after only receiving a user input confirming reception.

16. The receiving communication device (100B) of claim 13, wherein the content (510) is received from a first communication device (100A) and the controller is further configured to determine that the content (510) received have not already been received from a third communication device (100C) and if not, share the content (510) with the remaining communication devices in the sharing network (400).

17. The receiving communication device of claim 13, wherein the communication device is a mobile communications terminal such as a mobile phone or a computer tablet arranged for wireless communication.

18. A method for use in a communication device (100A) comprising a controller (210), a radio frequency interface (230) arranged to operate according to the Bluetooth™ standard, and a memory (240), wherein the method comprises:
    executing a sharing application stored in the memory (240);
    identifying at least one receiving communication device (100B, 100C) by detecting a presence of the receiving communication device (100B, 100C) being in close proximity, wherein close proximity is being within range of short range communication;
    establish a sharing network comprising the at least one receiving communication device (100B, 100C);
    presenting content (510);
    receiving a user input (U) indicating a share; and
    sharing the content (510) with the at least one receiving communication device (100B, 100C) through the sharing network over the radio frequency interface (230);
    wherein the method is characterized in that it further comprises
    identifying the receiving communication device (100B, 100C) by
        identifying the at least one receiving communication device (100B, 100C) through receiving an identifying broadcast emitted by the at least one receiving communication device (100B, 100C) according to a Low Power Bluetooth™ standard and by
        detecting that the receiving communication device (100B, 100C) is executing a compatible sharing application, wherein the sharing application is identified through the type of identifying broadcast or as part of a message included in the identifying broadcast or by the communication device (100A) prompting a response from the detected receiving communication device (100B, 100C) to identify which sharing application is executed by the receiving communication device (100B, 100C); and then initiating a connection with the at least one receiving communication device (100B, 100C) thereby establishing the sharing network (400) automatically, wherein the sharing network is established automatically without requiring the at least one receiving device to receive any user action, and wherein the controller is configured to share content upon receiving the user input, wherein at least one receiving communication device (100C) of the at least one receiving communication device (100B, 100C) is a receiving device (100C) that the communication device (100A) has previously not communicated with, wherein the radio frequency interface (230) is also arranged to operate according to a long range communication standard comprising the LTE (Long Term evolution) standard, and wherein the controller is configured to detect the presence of the at least one receiving communication device (100B, 100C) utilizing the Low Power Bluetooth™ standard and to share the content (510) with the receiving communication device (100B, 100C) utilizing the long range communication standard.

19. A method for use in a receiving communication device (100B) comprising a controller (210), a radio frequency interface (230) arranged to operate according to a Low Power Bluetooth™ standard, and a memory (240), wherein the method comprises:

executing a sharing application stored in the memory (240);

identifying at least one communication device (100A, 100C) according to claim 1 by detecting a presence of the at least one receiving communication device (100A, 100C) being in close proximity, wherein close proximity is being within range of short range communication and by receiving an identifying broadcast emitted by the at least one communication device (100A, 100C) according to the Low Power Bluetooth™ standard and detecting that the at least one communication device (100A, 100C) is executing a compatible sharing application, wherein the sharing application is identified through the type of identifying broadcast or as part of a message included in the identifying broadcast or by the receiving communication device (100B) prompting a response from the detected at least one communication device (100A, 100C) to identify which sharing application is executed by the at least one communication device (100A, 100C);

establishing of a connection initiated by the at least one communication device (100A, 100C), thereby establishing a sharing network (400), wherein the sharing network is established automatically without requiring the receiving device to receive any user action;

receiving content (510) from one of said at least one communication device (100A, 100C), wherein at least one receiving communication device (100C) of the at least one communication device (100B, 100C) is a receiving device (100C) that the communication device (100A) has previously not communicated with, wherein the radio frequency interface (230) is also arranged to operate according to a long range communication standard comprising the LTE (Long Term evolution) standard, and wherein the controller is configured to detect the presence of the at least one receiving communication device (100B, 100C) utilizing the Low Power Bluetooth™ standard and to share the content (510) with the receiving communication device (100B, 100C) utilizing the long range communication standard.

20. A non-transitory computer readable storage medium (30) encoded with instructions (31) that, when loaded and executed on a controller of a communication device (100, 200), causes the method according to claim 18 to be performed.

* * * * *